US008144127B2

(12) United States Patent
Shimasaki et al.

(10) Patent No.: US 8,144,127 B2
(45) Date of Patent: Mar. 27, 2012

(54) INPUT/OUTPUT INTEGRATED DISPLAY APPARATUS (75) Inventors: Ikuo Shimasaki, Nara (JP); Ryoh Hamada, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 669 days.

(21) Appl. No.: 12/370,677

(22) Filed: Feb. 13, 2009

(65) Prior Publication Data

US 2009/0207146 A1 Aug. 20, 2009

(30) Foreign Application Priority Data

Feb. 14, 2008 (JP) ................ 2008-033243

(51) Int. Cl.
*G06F 3/041* (2006.01)
(52) U.S. Cl. ............ 345/173; 345/179; 178/18.01; 178/18.03; 178/19.01; 178/19.05
(58) Field of Classification Search ........... 345/156, 345/157, 173, 179; 382/312, 314, 284, 188, 382/189, 106, 313, 187; 178/18.01–18.03, 178/19.01, 19.05; 463/37
See application file for complete search history.

(56) References Cited

U.S. PATENT DOCUMENTS

| | | | |
|---|---|---|---|
| 2004/0140965 A1* | 7/2004 | Wang et al. | 345/179 |
| 2005/0024346 A1* | 2/2005 | Dupraz et al. | 345/179 |
| 2007/0008304 A1* | 1/2007 | Tobin | 345/179 |
| 2010/0110007 A1* | 5/2010 | Akimoto | 345/158 |
| 2010/0283766 A1* | 11/2010 | Shieh | 345/179 |

FOREIGN PATENT DOCUMENTS

| | | |
|---|---|---|
| JP | 11-327789 A | 11/1999 |
| JP | 2000-247093 A | 9/2000 |
| JP | 2006-301970 A | 11/2006 |
| JP | 2006-302046 A | 11/2006 |
| JP | 2006-334403 A | 12/2006 |

* cited by examiner

*Primary Examiner* — Lun-Yi Lao
*Assistant Examiner* — Priyank Shah
(74) *Attorney, Agent, or Firm* — Birch, Stewart, Kolasch & Birch, LLP (57) ABSTRACT

An input/output integrated display apparatus according to an embodiment of the present invention includes a capture device for capturing an image of a user, an information register device for relating users' image information to pen settings information for each scheduled user and registers it, a user identification device for comparing image information of a user captured by the capture device with the users' image information and identifying a user in real time, and a display device for displaying text and lines entered by the user in a display format based on the pen settings information of the user identified by the user identification device on a display screen in real time. With this configuration, a user can be automatically identified, and text and lines are displayed based on the pen settings information of the user.

11 Claims, 6 Drawing Sheets

INPUT/OUTPUT INTEGRATED DISPLAY APPARATUS

BACKGROUND OF THE INVENTION

This application claims priority under 35 U.S.C. §119 (a) on Patent Application No. 2008-33243 filed in Japan on Feb. 14, 2008, the entire contents of which are incorporated herein by reference.

Use of input/output integrated display apparatuses, as typified by the electronic whiteboard, in conferences, lectures, etc. is spreading these days. The electronic whiteboard is an apparatus that permits text and lines to be drawn directly on its display screen with an input pen and displays the text and lines on the display screen. There is another type of electronic whiteboard that can further store text and lines displayed on the display screen in a storage medium and print out or output the text and lines in the form of electronic data. Such an electronic whiteboard can, not only display information entered with the input pen, but also directly display digital photographs, graphs, and so on, created by personal computers (PCs). As such, they are considered of very great practical use and are widely used.

As another type of electronic whiteboard, a color electronic whiteboard onto which text and lines can be entered in color is disclosed in, for example, JP H11-327789A.

With such a color electronic whiteboard, it is possible to display text and lines in a desired display format on the display screen by setting desired color and line width for each user before users enter text and lines. Thus, text and lines can be displayed on the display screen using particular color and line width for each user, and as a result, ease of visual identification can be provided to participants.

However, such electronic whiteboards capable of color display are problematic in that individual users have to set a pen color and a line width before they enter input, and it may not be so troublesome if this operation has to be done only once, but usually, conferences and lectures are held repeatedly, and thus users each individually have to make pen settings every time a conference or lecture is held, which is very troublesome. Furthermore, if there are multiple users, a significant amount of time is required for all of them to make their settings before they enter input.

SUMMARY OF THE INVENTION

The present invention has been conceived in view of the above circumstances, and it is an object of the present invention to provide an input/output integrated display apparatus in which it is unnecessary to set a display format for text and lines before the text and lines are entered.

An input/output integrated display apparatus according to the present invention is an input/output integrated display apparatus that displays, on a display, text and lines that user draws with an input pen on the same display screen, the apparatus including: a capture device for capturing an image of a user; an information register device for registering users' image information and pen settings information by associating with each other for each user to be scheduled to input, wherein the users' image information is obtained in advance by capturing images of the scheduled users with the capture device to be registered as user information for identifying a user, and wherein the pen setting information is registered as a display format of text and lines used when the scheduled user inputs; a user identification device for digitizing a user's image captured by the capture device, comparing the digitized image information with the users' image information registered by the information register device, and identifying a user in real time; and a display device for displaying text and lines entered by the user in a display format based on the pen settings information of the user identified by the user identification device on the display screen in real time.

According to the present invention, a user can be identified based on the users' image information obtained by capturing images of scheduled users by the capture device, and text and lines of the user are displayed automatically in a display format based on the pen settings information of the identified user. Accordingly, it is possible to eliminate the need to make pen settings each time a user enters text and lines onto the display screen.

The input/output integrated display apparatus according to the present invention may be configured to further include a correspondence analyzing device for, when a plurality of users input (at the same time), analyzing a positional relationship between position coordinates of each user and position coordinates of each set of text and lines so as to relate a text or line being currently in drawing to the user who is drawing it, wherein the position coordinates of each user is obtained from an image captured by the capture device, and wherein, at the same time, the position coordinates of an end of the text or line that is being drawn with each input pen is obtained based on input position of the text or line drawn with the input pen.

With this configuration, even when a plurality of users enter input onto the display screen, because the correspondence analyzing device defines correspondence between each set of text and lines and each user, and text and lines of the users are displayed in display formats based on the pen settings information set for each user, it is possible to display text and lines of the users in a distinguishable manner.

In the input/output integrated display apparatus according to the present invention, it is preferable that the pen settings information includes font, line color, line width and line type.

With this, different setting values can be set for various setting items, such as font, line color, line width and line type, for each scheduled user. Accordingly, it is possible to prevent settings from overlapping even when there are settings of multiple scheduled users.

Furthermore, the input/output integrated display apparatus according to the present invention may be configured to further include a pen settings information changing device for changing the pen settings information.

With this configuration, it is possible to change pen settings information that has been set in scheduled user registration, and thus when some of the display formats inputted are similar, causing a possibility of making the display screen difficult to view, or when it is necessary to customize the display formats to users' preferences, the pen settings information can be changed readily.

Furthermore, the input/output integrated display apparatus according to the present invention may be configured such that the pen settings information changing device stores default values of pen settings information when the pen settings information is changed.

With this configuration, the default values of pen settings information are stored when the pen settings information is changed, and thus it is possible to reset to the original pen settings information readily without the need to input individual setting values again.

Furthermore, the input/output integrated display apparatus according to the present invention may be configured such that the pen settings information is displayed on the display screen.

With this configuration, pen settings information is displayed on the display screen, and thus it is possible to clearly show, to viewers who are watching the display screen, to which user the text and lines displayed on the display screen belong.

Furthermore, the input/output integrated display apparatus according to the present invention may be configured such that a user pen holding determining device for determining whether or not the user is holding the input pen is further included, and the pen settings information of the user is displayed on the display screen when the user pen holding determining device has determined that the user is holding the input pen.

With such a configuration, pen settings information of a user is displayed on the display screen when the user holds the input pen, and thus it is possible to show, to participants, the pen settings information of the user in advance before he/she actually starts entering input onto the display screen. Furthermore, even if a person who is not scheduled to enter input is captured by the capture device and that person is identified as a user, unless that person touches the input pen, the pen settings information of that person is not displayed. Accordingly, it is possible to prevent unnecessary information from being displayed.

Furthermore, the input/output integrated display apparatus according to the present invention may be configured such that the pen settings information displayed on the display screen is hidden by pressing against an area in which the pen settings information is displayed with the input pen.

With such a configuration, if a situation occurs such as when text and lines are entered onto the entire display screen, and the display of pen settings information becomes a nuisance, by simply pushing against the area in which the pen settings information is displayed, the pen settings information can be hidden. Accordingly, text and lines can be displayed all over the entire display screen without interrupting the input operation of the user.

Furthermore, the input/output integrated display apparatus according to the present invention may be configured to further include a pen settings information display changing device for changing the display position of the pen settings information and/or the number of the pen settings information displayed.

With this configuration, the display position of pen settings information can be changed such that the pen settings information does not become a nuisance to the placement of text and lines on the display screen. Accordingly, the ease of visual identification of the display screen can be increased. Furthermore, a situation can occur in which the display of pen settings information is hidden behind the user depending on the display position of the pen settings information, but with this configuration, the pen settings information can be displayed in a plurality of places on the display screen, viewers can see the pen settings information regardless of the position of the viewers.

Furthermore, the input/output integrated display apparatus according to the present invention may be configured to further include a display format changing device for changing the display format of all or part of the text and lines displayed on the display screen to a different display format.

With this configuration, the display format of all or part of the text and lines displayed on the display screen can be changed to a different display format. Accordingly, it is possible to emphasize the text and lines within a selected area, and increase the ease of visual identification.

Furthermore, the input/output integrated display apparatus according to the present invention may be configured to further include an input restriction device for restricting input depending on the user.

With this configuration, it is determined whether the user is a person who satisfies predetermined conditions, or the like, and input onto the display screen is restricted based on the determination. Accordingly, it is possible to prevent unauthorized people, strangers, and so on from entering additional information.

Furthermore, the input/output integrated display apparatus according to the present invention may be configured to further include a display-by-user device for displaying or hiding text and lines drawn on the display screen by a plurality of users for each user.

With this configuration, even when text and lines entered by a plurality of users are displayed on the display screen, making the display screen difficult to view, it is possible to set whether to display or hide the text and lines for each user, and thus ease of visual identification of the text and lines displayed on the display screen can be provided to viewers.

DETAILED DESCRIPTION OF PREFERRED EXAMPLES

Hereinafter, a preferred embodiment of an input/output integrated display apparatus according to the present invention will be described with reference to the accompanying drawings.

Figure 1:
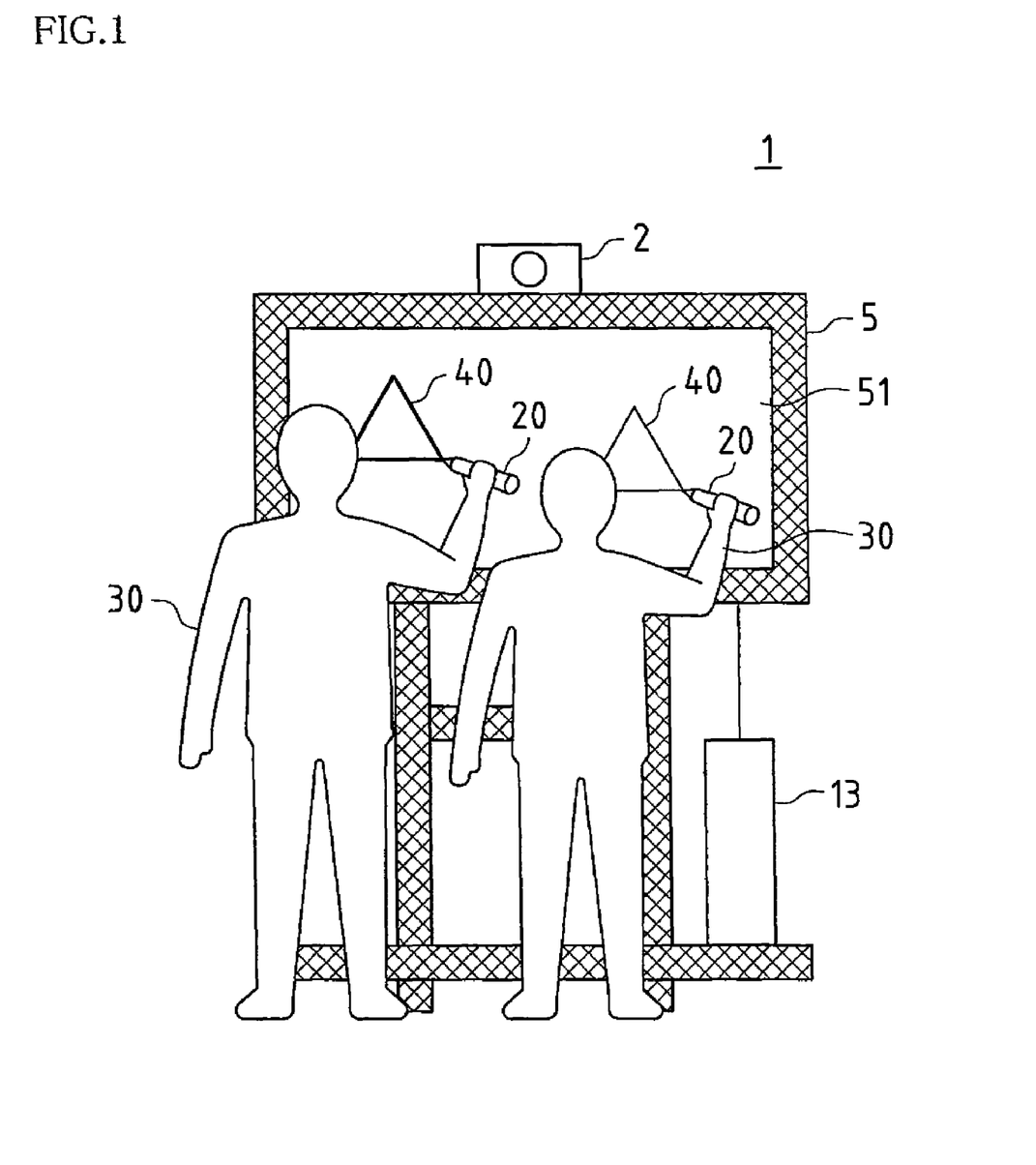
FIG. 1 is a diagram used to illustrate an example of usage of an input/output integrated display apparatus according to an embodiment of the present invention.

An input/output integrated display apparatus 1 according to an embodiment of the present invention displays text and lines 40 that are drawn with input pens 20 on a display screen 51 directly on the display screen 51. The input/output integrated display apparatus 1 also automatically identifies users 30 who enter input onto the display screen 51, and displays the text and lines 40 of the users 30 in different display formats that have been set for each user 30 so as to distinguish the text and lines 40 of one user 30 from those of another user 30.

Figure 2:
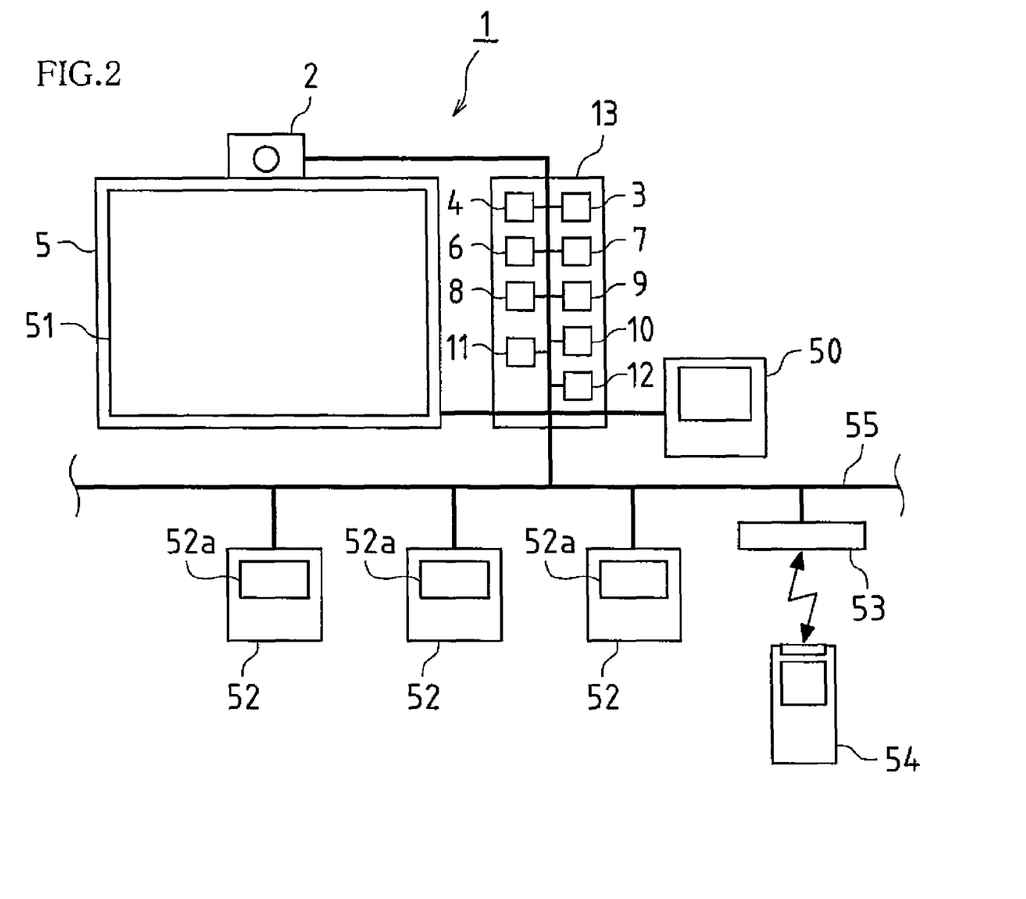
FIG. 2 is a diagram used to illustrate the input/output integrated display apparatus according to an embodiment of the present invention.
Figure 3A:
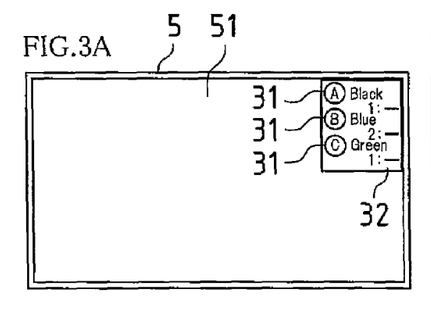
FIGS. 3A to 3G are diagrams used to illustrate overall display patterns of pen settings information displayed on a display screen of the input/output integrated display apparatus according to an embodiment of the present invention.
Figure 3B:
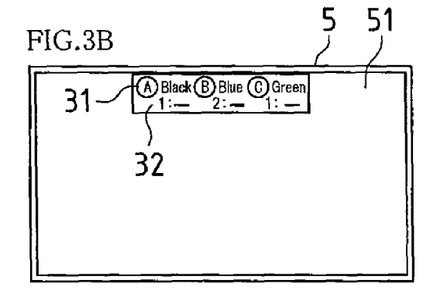
Figure 3C:
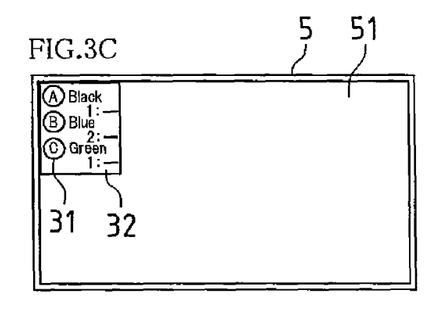
Figure 3D:
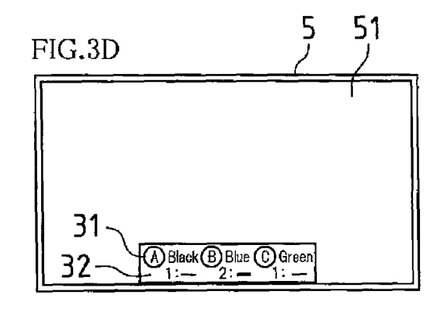
Figure 3E:
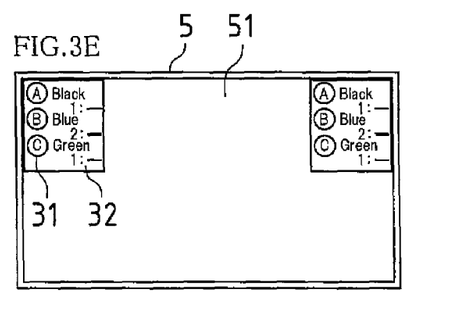
Figure 3F:
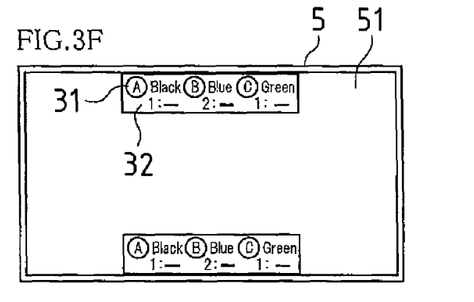
Figure 3G:
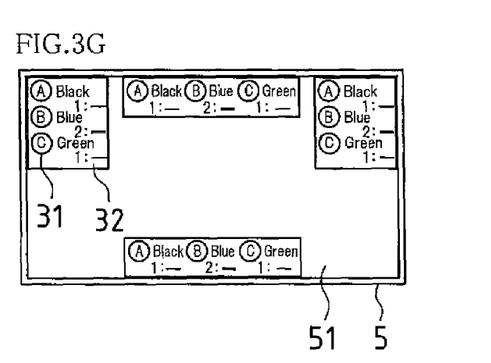

Specifically, the input/output integrated display apparatus 1 includes a capture device 2 for capturing users 30, an information register device 3 for registering users' image information used to identify users 30 and pen settings information 32, a user identification device 4 for identifying users 30, and a display device 5 for displaying text and lines 40 on the display screen 51 based on the pen settings information 32 of users 30.

The input/output integrated display apparatus 1 may further include a correspondence analyzing device 6 for, when a plurality of users 30 input text and lines 40 simultaneously, defining correspondence between the simultaneously entered sets of text and lines 40 and the respective users 30.

As shown in FIG. 2, the information register device 3, the user identification device 4 and the correspondence analyzing device 6 are incorporated in a controller unit 13, and they are configured such that pen settings information 32 can be set or changed with a dedicated terminal 50 connected to the controller unit 13. The input/output integrated display apparatus 1 can be connected to a LAN (local area network) 55 such that access to pen settings information 32 is possible via terminals 52 such as PCs or a portable wireless terminal 54 (i.e., a device that can interactively exchange information via a receive apparatus 53 connected to the LAN 55). With such a configuration, it is possible to set or change pen settings information 32 using a terminal other than the dedicated terminal 50 for operating the controller unit 13.

The constituent elements of the input/output integrated display apparatus 1 will be described next.

The capture device 2 captures images of users 30 who are entering input onto the display screen 51 of the display device 5 using input pens 20. The capture device 2 can be, for example, a camera that employs, as an image sensor, a CCD (charge coupled device) or CMOS (complementary metal oxide semiconductor), and has a capture range that covers the entire area in which a user 30 can move in front of the display device 5 when he/she enters input onto the display screen 51. Thus, it is possible to obtain position coordinates within the capture range in which a user 30 can move in front of the display device 5.

The capture device 2 is also used as a device for capturing images of users 30 that are used as users' image information that is referred to in order to identify users 30. That is, this capture device 2 is used when capturing images of the faces of scheduled users (or in other words, registrants).

The information register device 3 is a device for registering users' image information as user information for identifying users 30 who enter input onto the display screen 51 and pen settings information 32 as display formats for text and lines 40 that are used when scheduled users enter input by relating them to respective scheduled users. The users' image information is formed through image processing of scheduled users' face images 31 captured by the capture device 2 in advance, as user information for identifying a user who enters input onto the display screen 51.

As used herein, "image processing" refers to a process in which a captured image is converted to data so that the face image 31 of the captured person can be distinguished from the face images 31 of other scheduled users. For example, it is performed such that predetermined position coordinates such as the facial contour, the position of the pupil, the position of the wings of the nose, the position of the outer corners of the eyes, and the lip corners, are identified through image analysis, and the positional relationship of these position coordinates are digitized.

Likewise, "pen settings information 32" refers to settings information that includes values set for respective setting items of a display format that is used when displaying text and lines 40 entered by a user 30 on the display screen 51, and it is individually set for each scheduled user (hereinafter also referred to as a "registrant"). The pen settings information 32 includes, for example, setting values such as font, line color, line width, line type (solid line, broken line, dotted line, long dashed short dashed line, long dashed double-short dashed line, etc.).

With such settings, different setting values can be set in various setting items, such as font, line color, line width and line type, for each scheduled user, and therefore even when settings are made for multiple users, overlap in settings can be prevented. As such, even when multiple users enter input, the text and lines 40 can be displayed on the display screen 51 in different display formats according to users 30, and therefore the text and lines 40 can be clearly distinguished from one another, and mixing up of text and lines 40 can be prevented.

The pen settings information 32 may be configured to be capable of being changed by a pen settings information changing device 7. The pen settings information changing device 7 is a device for changing the line color, line width, line type, font and so on that have been set upon registration, and is configured such that its interface screen is displayed on the dedicated terminal 50 or the terminals 52. With this, it is possible to make settings to increase the ease of visual identification of text and lines 40 on the display screen 51 as appropriate. For example, if users 30 are using lines of similar colors, either of the line colors can be changed to a different color to distinguish one from other users via the interface screen of the pen settings information changing device 7, and as a result, the ease of visual identification of the display screen 51 can be improved.

It is also possible to configure the pen settings information changing device 7 such that, when changing pen settings information 32, the default values are stored. With such a configuration, the need to input individual setting values again can be eliminated, and the settings of pen settings information 32 can be readily reset to the default values.

Also, the pen settings information 32 is displayed on the display screen 51. Thus, it is possible to reliably show, to viewers of the display screen 51, which of the text and lines 40 displayed on the display screen 51 belongs to which user. Furthermore, in public conferences and the like, it is often the case that general participants do not know the name and face of users 30, and so the participants have difficulty in identifying which text and lines belong to which user 30. In such a case, the face images 31 of users 30 may be displayed together with the pen settings information 32 of the users 30, as shown in FIGS. 3A to 3G.

It is preferable that the pen settings information 32 is displayed on the display screen 51 automatically when a user 30 holds an input pen 20.

Specifically, if it is determined that a user 30 is holding an input pen 20 by a user pen holding determining device 12 that determines whether or not a user 30 is holding an input pen 20, the pen settings information 32 of the user 30 is displayed on the display screen 51. The user pen holding determining device 12 is configured such that it determines whether or not a user 30 is holding an input pen 20 by obtaining the position coordinates of the user 30 from an image captured by the capture device 2, identifying the input pen 20 from the image captured by the capture device 2 based on input pen identification information for identifying an input pen 20, obtaining the position coordinates of the input pen 20, and analyzing the positional relationship between the position coordinates of the user 30 and the position coordinates of the input pen 20 as well as the distance therebetween. As used herein, "input pen identification information" is information that includes planar image information obtained by capturing images of an input pen 20 that is equipped by the input/output integrated display apparatus 1 from multiple directions and is used to identify the pen 20 from surrounding images regardless of the angle at which the input pen 20 is held.

With this configuration, the pen settings information 32 of a user 30 is displayed on the display screen 51 when the user 30 holds an input pen 20, and therefore the pen settings information 32 of the user 30 can be shown to participants in advance before the user 30 actually starts entering input onto the display screen 51. Even if a situation occurs in which a person who is not scheduled to enter input is captured by the capture device 2 and that person is identified as a user 30, unless that person holds an input pen 20, the pen settings information 32 of that person is not displayed. Accordingly, it is possible to prevent unnecessary information from being displayed.

It is also possible to adopt a configuration in which the pen settings information 32 displayed on the display screen 51 are hidden by pressing against the area in which the pen settings information 32 is displayed with the input pen 20.

With such a configuration, if a situation occurs such as when text and lines 40 are entered onto the entire display screen 51, and the display of pen settings information 32 becomes a nuisance, by simply pushing against the area in which the pen settings information 32 is displayed, the pen settings information 32 can be hidden. Accordingly, text and lines 40 can be displayed all over the entire display screen 51 without interrupting the input operation of the user 30. With respect to the press operation for hiding pen settings information 32, in order to distinguish from that when text and lines 40 are entered, it is preferable to use, as the hiding operation of pen settings information 32, a press operation that is not normally performed when text and lines 40 are entered. The hiding operation of pen settings information 32 can be, for example, a continuous double pressing operation in the small area.

The display method of pen settings information 32 on the display screen 51 can be changed by a pen settings information display changing device 8. Specifically, the pen settings information display changing device 8 can be configured so as to be capable of displaying or hiding pen settings information 32 as appropriate and also to be capable of displaying an interface screen for performing control to display or hide pen settings information 32 on the dedicated terminal 50 or the terminals 52. With this, pen settings information 32 can be displayed whenever necessary, and the ease of visual identification of text and lines 40 displayed on the display screen 51 can be increased. The pen settings information display changing device 8 is also configured so as to be capable of changing (or moving) the display position of pen settings information 32 and the number of pen settings information 32 displayed as shown in FIGS. 3A to 3G. With such a configuration, the display position of pen settings information 32 can be changed (or moved) such that the pen settings information 32 does not become a nuisance to the placement of text and lines 40 in the display screen 51. Accordingly, the ease of visual identification of the display screen 51 can be increased. Furthermore, a situation can occur in which the display of pen settings information 32 is hidden behind the user 30 depending on the display position of the pen settings information 32, but with this configuration, the pen settings information 32 can be displayed in a plurality of places on the display screen 51, viewers can see the pen settings information 32 regardless of the position of the viewers.

The user identification device 4 is a device for identifying a user 30 who is entering input onto the display screen 51. Specifically, the user identification device 4 specifies a user 30 by digitizing the face image 31 of the user 30 captured by the capture device 2, and comparing the digitized image information with users' image information to find the corresponding user 30. In addition, the user identification device 4 operates whenever the input/output integrated display apparatus 1 is being used, and performs identification of user 30 in real time.

When there is only one user 30, the user 30 and input information of the user 30 are in one-to-one correspondence, and thus no problem arises. However, when there are a plurality of users 30 and they enter input onto the display screen 51 simultaneously, it is necessary to determine to which user 30 input information that is being entered belongs. If such a case occurs, the correspondence relationship is analyzed by the correspondence analyzing device 6.

The correspondence analyzing device 6 is configured such that, when the user identification device 4 has determined that a plurality of users 30 are entering text and lines 40 onto the display screen 51, the correspondence analyzing device 6 obtains the position coordinates of each user 30 from the image of each user 30 captured by the capture device 2 as well as the position coordinates of text and lines 40 that are being drawn with an input pen 20, and defines correspondence between the text and lines 40 being drawn and the user 30 based on the positional relationship between the position coordinates of each user 30 and the position coordinates of each set of text and lines 40.

The display device 5 displays text and lines 40 being entered by a user 30 on the display screen 51 in real time with a display format based on the pen settings information 32 of the user 30 identified by the user identification device 4.

Specifically, the display device 5 includes a color panel and a touch panel that is disposed on the display screen 51 of the color panel. The color panel can be, for example, a liquid crystal display apparatus. The touch panel includes two transparent electrode substrates that are disposed in parallel, and is configured as follows. The touch panel outputs the coordinates of a position to which pressure is applied by an input pen 20, and then drives the liquid crystal of the position coordinates that correspond to the coordinates of the position to which pressure is applied by the input pen 20, and as a result, text and lines 40 drawn by the input pen 20 are displayed on the display screen 51. The touch panel also displays the text and lines 40 of the user 30 in a display format based on the pen settings information 32 that is registered in advance with the information register device 3.

If, for example, in pen settings information 32, the display format of Mr. A is set such that graphics are displayed with a black solid line having a line width of 3 mm, and texts are displayed with the Mincho font (a Japanese font), the graphics entered by Mr. A are displayed with a black solid line having a line width of 3 mm, and the texts entered by Mr. A are displayed with the Mincho font after the font and size are determined by a letter recognition apparatus.

When a plurality of users 30 are entering input simultaneously, each user 30 is identified by the user identification device 4 in real time, correspondence between text and lines 40 that are being drawn on the display screen 51 and each corresponding user 30 is defined by the correspondence analyzing device 6, and the text and lines 40 of each user 30 are displayed in a display format based on the pen settings information 32. Thus, the text and lines 40 entered by respective users 30 can be displayed in a distinguishable manner.

A situation can be conceived in which text and lines 40 of a plurality of users 30 are displayed simultaneously on the display screen 51 and viewers are confused by all of the text and lines 40 and find it difficult to identify whose is whose. In order to eliminate such difficulty in identification on the display screen 51, a display-by-user device 11 may be provided that displays or hides text and lines 40 for each user 30.

The display-by-user device 11 is configured so as to be capable of displaying or hiding text and lines 40 for each user 30 by storing text and lines 40 entered onto the display screen 51 separately for each user 30 in a storage medium, and to be capable of displaying an interface screen for selecting whether to display or hide the text and lines on the dedicated terminal 50 or the terminals 52. With such a configuration, it is possible to hide unnecessary text and lines 40 and display only necessary text and lines 40 that should be displayed, and therefore even when a plurality of sets of text and lines 40 are displayed on the display screen 51, making the display screen 51 difficult to view, the ease of visual identification of the text and lines 40 displayed on the display screen 51 can be provided to viewers.

Furthermore, another situation can be conceived in which, in a conference or the like, a need to change the display format of all or part of the text and lines 40 displayed on the display screen 51 arises in order to emphasize part of the text and lines displayed on the display screen 51.

To cope with this, in addition to the above constituent elements, a display format changing device 9 for changing the display format of all or part of the text and lines 40 displayed on the display screen 51 to a different display format may be provided in the input/output integrated display apparatus 1.

The display format changing device 9 includes a selection device (not shown in the drawings) for selecting a desired area on the display screen 51 and a display format setting device (not shown in the drawings) for setting the display format of the selected area. The selection device may be configured so as to be capable of selecting all or part of the text and lines 40 entered onto the display screen 51, or so as to be capable of selecting an area including text and lines 40 (that is, an area including the background). The display format setting device 9 may be configured so as to be capable of changing only the display format of the selected text and lines 40, or so as to be capable of further changing the display format of the background. With such a configuration, it is possible to display a selected area of the text and lines 40 displayed on the display screen 51 in a different display format, or change the display format of the background. Accordingly, the text and lines 40 within the selected area can be emphasized and the ease of visual identification can be increased.

Furthermore, in addition to the above configurations, the input/output integrated display apparatus 1 may further include an input restriction device 10 for restricting input onto the display screen 51 depending on the user 30.

The input restriction device 10 is configured such that it restricts input of a user 30 when the user 30 is identified as a person who is not permitted to enter input onto the display screen 51 by the user identification device 4.

Specifically, the input restriction device 10 is configured such that it causes the user identification device 4 to specify a user 30 based on the face image 31 of the user 30 captured by the capture device 2, check whether the user 30 is a person who is permitted to enter input by referring to the user information of the specified user 30, and when the user 30 is a person who is not permitted to enter input, delete the input information entered to the display screen 51, and then provide an instruction to not display that input information on the display screen 51 to the display device 5. The information indicative of input permission used here (hereinafter also referred to as "input permission information") is registered in advance for each scheduled user by the information register device 3.

The input restriction device 10 may have another configuration. For example, the input restriction device 10 may be configured such that, if a user 30 is not specified after the user identification device 4 is caused to operate with the face image 31 of the user 30 captured by the capture device 2 as user information, it determines that the user 30 is a person who is not permitted to enter input, then deletes the input information entered onto the display screen 51 and provides an instruction to not display that input information on the display screen 51 to the display device 5.

With such an input restriction device 10, input is restricted depending on the user 30, and thus it is possible to prevent unauthorized people, strangers, and so on from entering additional information. Therefore, even when the input/output integrated display apparatus 1 is left while text and lines 40 are displayed on the display screen 51, it is possible to prevent the information from being tampered with.

With the input/output integrated display apparatus 1 described above, a user 30 is specified based on users' image information obtained by capturing images of scheduled users with the capture device 2, and text and lines entered by the specified user 30 are displayed automatically in a display format based on the pen settings information 32 of the specified user 30. Accordingly, it is possible to eliminate the need for the user 30 to make pen settings each time he/she enters text and lines 40 onto the display screen 51.

Furthermore, even when a plurality of users 30 enter input onto the display screen 51, the correspondence analyzing device 6 defines correspondence between each set of text and lines 40 and each user 30, and the text and lines 40 of each user 30 are displayed in a display format based on pen settings information 32 set for each user 30, and it is therefore possible to display the text and lines 40 of each user 30 in a distinguishable manner.

Next, settings that are made before the input/output integrated display apparatus 1 is used, an operation of the apparatus 1 when it is used, and a settings change operation will be described.

Figure 4:
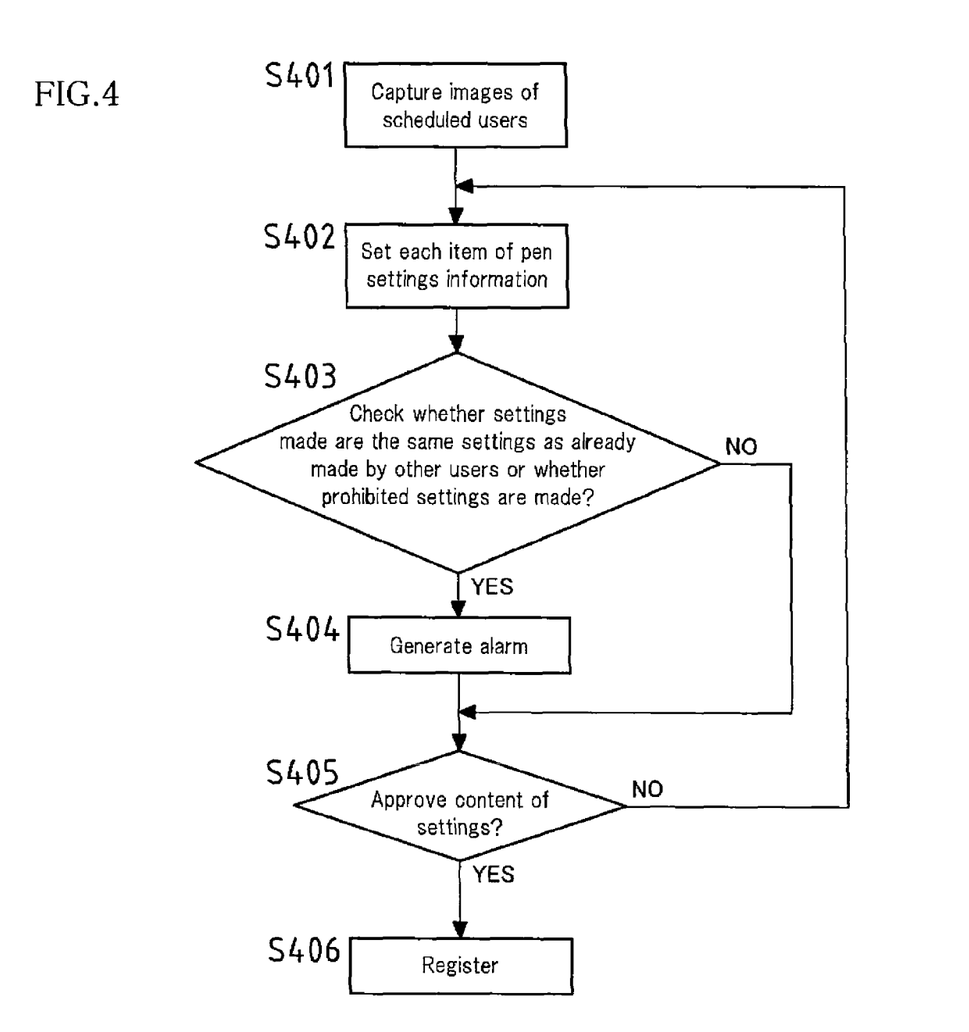
FIG. 4 is a flowchart illustrating a scheduled user registration method performed before the input/output integrated display apparatus according to an embodiment of the present invention is used.
Figure 5:
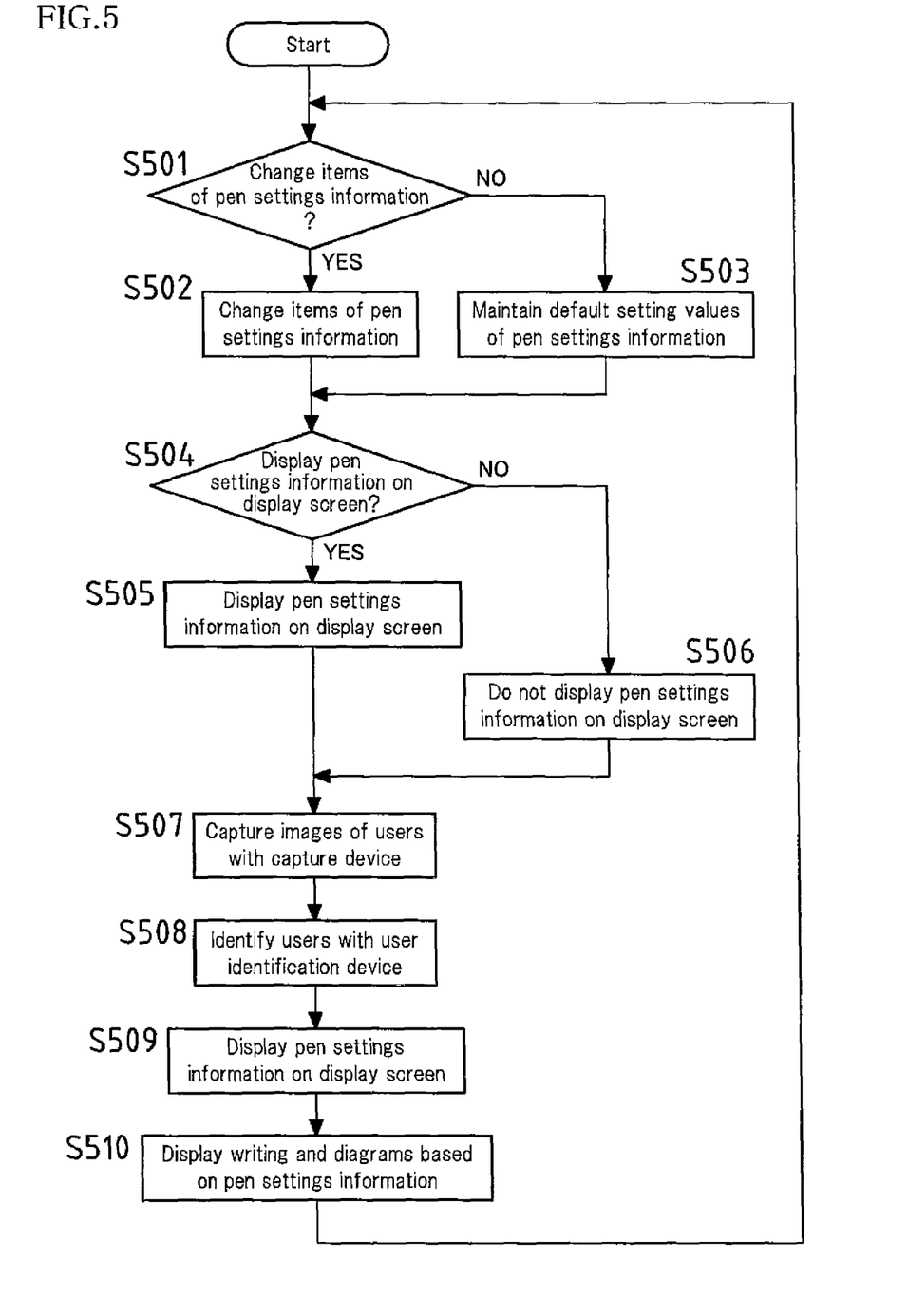
FIG. 5 is a flowchart illustrating an operation of the input/output integrated display apparatus according to an embodiment of the present invention when it is used.
Figure 6:
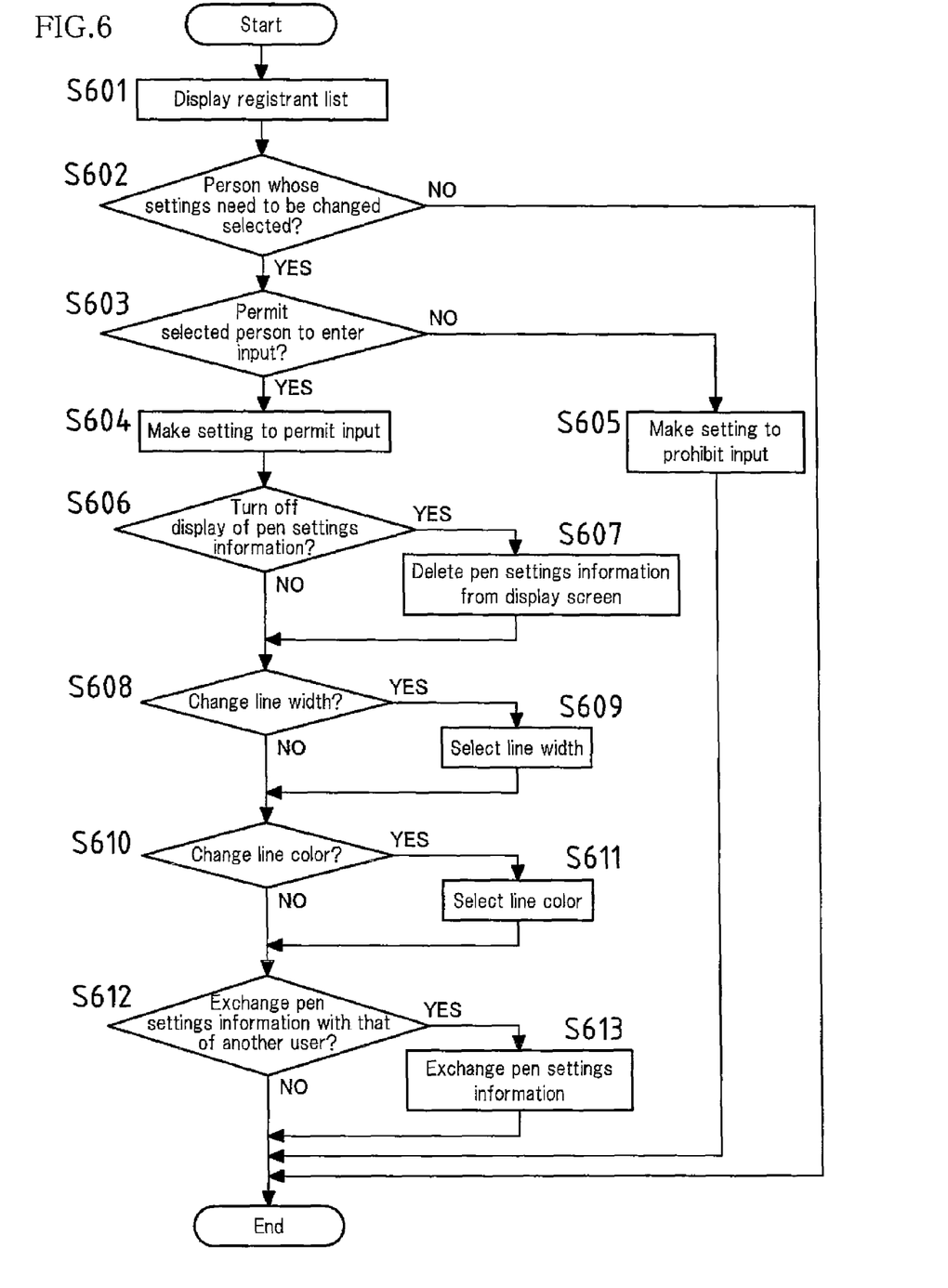
FIG. 6 is a flowchart illustrating a method for changing settings of the input/output integrated display apparatus according to an embodiment of the present invention.

FIG. 4 is a flowchart illustrating a scheduled user registration method performed by the input/output integrated display apparatus 1 before it is used. FIG. 5 is a flowchart illustrating an operation of the input/output integrated display apparatus 1 when it is used. FIG. 6 is a flowchart illustrating a settings change method of the input/output integrated display apparatus 1.

A scheduled user registration method performed by the input/output integrated display apparatus 1 before it is used will be described first with reference to FIG. 4.

A scheduled user is captured by the capture device 2 (S401). A captured face image 31 of the scheduled user is stored in a controller unit 13 as users image information.

Next, settings (hereinafter also referred to as "pen settings") of display format such as line color, line width, font, etc., (respective items of pen settings information 32) are made to the controller unit 13 by the scheduled user using a terminal 52 connected to the LAN 55 (S402). The pen settings information 32 is related to users' image information by the information register device 3 and registered with the controller unit 13.

At this time, it is checked whether the settings made are the same settings as already made by other registrants for pen settings information 32, or whether prohibited settings are made (for example, a display format that would be difficult to view when displayed is set, such as a line color similar to the background color, or an extremely thin line) (S403). If any one of the above applies, an alarm is generated from the controller unit 13 through the display 52a of the terminal 52 (S404). Through this, it is possible to prevent a situation in which text and lines 40 of a plurality of users are displayed in the same display format. It is also possible to prevent a situation in which text and lines 40 are displayed in a display format that is difficult to view.

The pen settings information 32 set in the above-described manner is displayed on the display 52a of each terminal 52, and the scheduled user checks the content of the pen settings information 32. If the scheduled user approves the content of the pen settings information 32 (S405), the pen settings information 32 is related to the users' image information of the scheduled user, and then registered (S406). If, on the other hand, the scheduled user does not approve the pen settings information 32, he/she makes pen settings again (S402).

Next, an operation of the input/output integrated display apparatus 1 when it is used will be described with reference to FIG. 5.

First, upon startup of the input/output integrated display apparatus 1, it is checked whether or not to change setting values of the items of pen settings information 32 (S501). In the case of changing the pen settings information 32, the pen settings information changing device 7 is activated, and its interface screen is displayed on the terminals 52 so that the pen settings can be changed. A user 30 accesses the controller unit 13 with the terminal 52 and changes the pen settings information 32 (S502). In the case of not changing the pen settings, the pen settings information 32 remains by default, that is, preset default setting values are maintained (S503).

Then, it is determined whether or not to display pen settings information 32 on the display screen 51 (S504). If it is determined to display pen settings information 32 on the display screen 51, pen settings information 32 is displayed for each user 30 (S505). At this time, it is possible to set the display method of pen settings information 32, such as the display position of pen settings information 32 and the number of pen settings information 32 displayed. However, at the time when these settings are made, the user 30 is not captured yet and thus is not identified, and so the pen settings information 32 is made blank at this time. If, on the other hand, it is determined to not display pen settings information 32 on the display screen 51, pen settings information 32 is not displayed on the display screen 51 (S506).

After these settings are made, the capture device 2 is activated, and the user 30 who is present in front of the display device 5 is captured (S507).

Upon capturing, by the user identification device 4, image processing of a captured face image 31 of the user 30 is performed, users' image information is referred to, information that matches the captured image information is searched for, and the user 30 is identified (S508). Then, the pen settings information 32 of the identified user 30 is acquired, and the pen settings information 32 of the user 30 is displayed on the display screen 51 (if a setting is made to not display pen settings information 32, the information is not displayed) (S509), and text and lines 40 entered by the user 30 are displayed in the display format based on the pen settings information 32 of the user 30 on the display screen 51 (S510).

When there are a plurality of users 30, in the same manner as described above, users' image information is referred to, and each user 30 is identified (S508). Then, pen settings information 32 of each of the identified users 30 are acquired, and the pen settings information 32 of each user 30 is displayed on the display device 5 (S509), and text and lines entered by the plurality of users 30 are displayed in display formats based on pen settings information 32 of the respective users 30 on the display screen 51 (S510). Specifically, by the user identification device 4, the plurality of users 30 are identified (S508), the position coordinates of each of the users 30 (for example, the center position of a face image 31 is used as the position coordinates of the user 30) are obtained based on the image captured by the capture device 2, and the position coordinates of each input pen 20 used by each of the plurality of users 30 (the position coordinates of the tip of an input pen 20) are obtained. Then, based on the positional relationship between the position coordinates of each user 30 and the position coordinates of the input pen 20, text and lines 40 that are being drawn are corresponded to the user 30 in real time. Then, each set of text and lines 40 is displayed in the display format based on the pen settings information 32 of each of the identified users 30 (S510).

Next, a method for changing the settings of pen settings information 32 and the settings of input permission information will be described with reference to FIG. 6.

Changes of the information are performed with a terminal 52 (or the dedicated terminal 50) connected to the controller unit 13.

When making a change in the settings, first, a registrant list of already registered registrants (or in other words, scheduled users) is read out from the controller unit 13, and displayed on the display 52a of the terminal 52 (S601). Next, a person whose settings need to be changed is selected from the registrant list (S602).

It is then determined whether or not to permit the selected person to enter input (S603). If the selected person is permitted to enter input, a setting to permit input is made as additional information to the users' image information (S604). If, on the other hand, the selected person is not permitted, a setting to prohibit input is made as additional information to the users image information (S605). Upon making the input prohibition setting, the settings change operation is ended. However, there are cases where the input prohibition setting is made only temporarily. Accordingly, a configuration may be employed in which an operation to change other settings is performed after the input prohibition setting is made.

Next, a setting to select whether or not to turn off the display of pen settings information 32 is made (S606). If a setting is made to turn off the display of pen settings information 32, then, the pen settings information 32 is deleted from the display screen 51 (S607).

Next, the pen settings information 32 of the selected person is changed.

Specifically, it is selected whether or not to change the pen line width (S608). If it is selected to change the pen line width, a line width is set by selecting any one from the preset line widths (S609). This line width setting can be performed by inputting a numerical value. Subsequently, it is selected whether or not to change the line color (S610). If it is selected to change the line color, a line color is set by selecting any one of the preset line colors (S611). Furthermore, when exchanging the pen settings information 32 with that of another person, it is selected whether or not to exchange the pen settings information 32 (S612). This exchange is performed by selecting an exchange person by referring to the registered pen settings information 32 (S613).

The present invention can be embodied and practiced in other different forms without departing from the gist and essential characteristics thereof. Therefore, the above-described embodiments are considered in all respects as illustrative and not restrictive. The scope of the invention is indicated by the appended claims rather than by the foregoing description. All variations and modifications falling within the scope of the appended claims are intended to be embraced therein.

What is claimed is:

1. An input/output integrated display apparatus that displays, on a display, text and lines that user draws with an input pen on the same display screen, the apparatus comprising:

a capture device for capturing an image of a user;

an information register device for registering users' image information and pen settings information by associating with each other for each user to be scheduled to input, wherein the users' image information is obtained in advance by capturing images of the scheduled users with the capture device to be registered as user information for identifying a user, and wherein the pen setting information is registered as a display format of text and lines used when the scheduled user inputs;

a user identification device for digitizing a user's image captured by the capture device, comparing the digitized image information with the users' image information registered by the information register device, and identifying a user in real time;

a display device for displaying text and lines entered by the user in a display format based on the pen settings information of the user identified by the user identification device on the display screen in real time; and a correspondence analyzing device for, when a plurality of users input (at the same time), analyzing a positional relationship between position coordinates of each user and position coordinates of each set of text and lines so as to relate a text or line being currently in drawing to the user who is drawing it, wherein the position coordinates of each user is obtained from an image captured by the capture device, and wherein, at the same time, the position coordinates of an end of the text or line that is being drawn with each input pen is obtained based on input position of the text or line drawn with the input pen.

2. The input/output integrated display apparatus according to claim 1, wherein the pen settings information includes font, line color, line width and line type.

3. The input/output integrated display apparatus according to claim 1, further comprising a pen settings information changing device for changing the pen settings information.

4. The input/output integrated display apparatus according to claim 3, wherein the pen settings information changing device stores default values of pen settings information when the pen settings information is changed.

5. The input/output integrated display apparatus according to claim 1, wherein the pen settings information is displayed on the display screen.

6. The input/output integrated display apparatus according to claim 5, further comprising a user pen holding determining device for determining whether or not the user is holding the input pen, wherein the pen settings information of the user is displayed on the display screen when the user pen holding determining device has determined that the user is holding the input pen.

7. The input/output integrated display apparatus according to claim 5, wherein the pen settings information displayed on the display screen is hidden by pressing against an area in which the pen settings information is displayed with the input pen.

8. The input/output integrated display apparatus according to claim 5, further comprising a pen settings information display changing device for changing the display position of the pen settings information and/or the number of the pen settings information displayed.

9. The input/output integrated display apparatus according to claim 1, further comprising a display format changing device for changing the display format of all or part of the text and lines displayed on the display screen to a different display format.

10. The input/output integrated display apparatus according to claim 1, further comprising an input restriction device for restricting input depending on the user.

11. The input/output integrated display apparatus according to claim 1, further comprising a display-by-user device for displaying or hiding text and lines drawn on the display screen by a plurality of users for each user.

* * * * *